United States Patent

[11] 3,594,891

| [72] | Inventors | Ernest R. Cunningham<br>Libertyville;<br>Ronald C. Owen, Harwood Heights, both of, Ill. |
|---|---|---|
| [21] | Appl. No. | 6,099 |
| [22] | Filed | Jan. 27, 1970 |
| [45] | Patented | July 27, 1971 |
| [73] | Assignee | Illinois Tool Works Inc.<br>Chicago, Ill. |

[54] CONTAINER CARRIER
10 Claims, 4 Drawing Figs.

[52] U.S. Cl. ................................................ 29/450,
215/100 A, 264/291, 264/320, 294/31.2, 294/87.2
[51] Int. Cl. ..................................................... A47j 45/07
[50] Field of Search .......................................... 294/31.2,
87.2; 215/100; 224/55, 58; 264/286, 291, 320;
29/428, 450

[56] References Cited
UNITED STATES PATENTS

| 2,914,826 | 12/1959 | Then ............................. | 24/17 |
| 3,137,423 | 6/1964 | Tupper ......................... | 224/45 |
| 3,269,530 | 8/1966 | Wanderer ..................... | 206/65 |
| 3,316,941 | 5/1967 | Neumaier ..................... | 139/88 |

FOREIGN PATENTS

| 1,292,843 | 3/1962 | France ........................ | 215/100 |

Primary Examiner—Evon C. Blunk
Assistant Examiner—Johnny D. Cherry
Attorneys—Robert W. Beart, Michael Kovac, Barry L. Clark and Jack R. Halvorsen ABSTRACT: This invention relates to a plastic container carrier and the provision of a generally U-shaped bail portion for the container carrier. The carrier is formed from a strip of thermoplastic material and the bail portion is formed coplanar with the remaining portion of the carrier. The bail portion is cold worked to increase its length, decrease its thickness and provide a flexible handle for the container carrier.

PATENTED JUL 27 1971
3,594,891
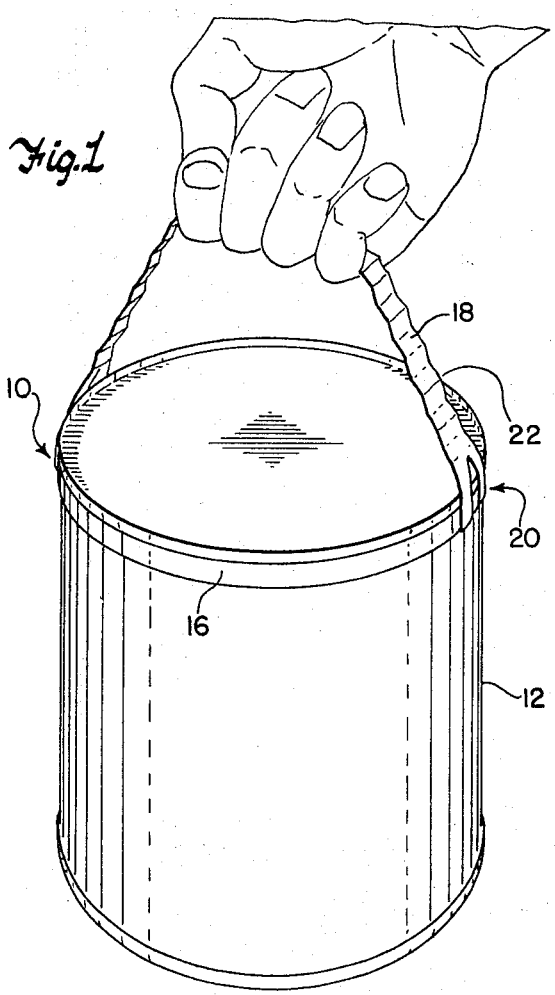
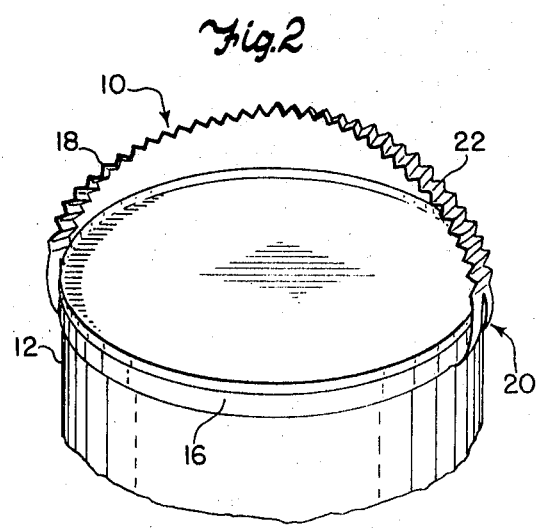
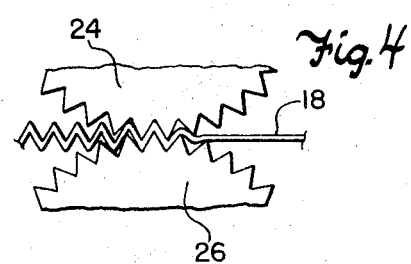
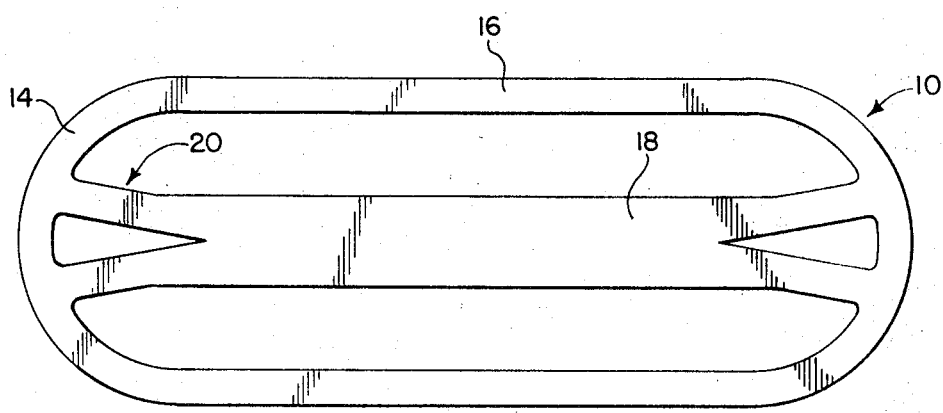
INVENTOR.
Ernest R. Cunningham
BY Ronald C. Owen
Their Att'ys

CONTAINER CARRIER

BACKGROUND OF THE INVENTION

1. Field of the Invention

This invention is generally concerned with a container carrier, and more particularly with carriers for holding and positioning large containers such as paint cans or the like.

2. Description of the Prior Art

Carriers for paint cans or the like generally consist of wire bail portions connected to apertures in portions attached to the top of the paint container. This carrier system has a number of inherent disadvantages. For example, the wire bail is extremely uncomfortable for the individual carrying the container when the container and its contents are relatively heavy. This carrier device also necessitates an extra element and extra steps to position the bail on the container.

The present invention is directed to plastic carriers for single containers wherein each plastic carrier includes an integral handle means within the confines of the carrier which is configured to overcome the aforementioned prior art difficulties.

It is an object of this invention to provide a plastic carrier suitable for carrying single containers.

It is another object of this invention to provide a container carrier with a flexible bail portion.

It is still another object of this invention to provide a plastic container carrier capable of being manufactured efficiently in large quantities.

These and other objects of the present invention are accomplished by the provision of a carrier having an endless band with a flexible, integral bail portion extending across the aperture of the band and located entirely within the endless band.

BRIEF DESCRIPTION OF THE DRAWINGS

FIG. 1 is a perspective view of a container carrier embodying the present invention wherein the carrier is shown applied to a large container with the bail portion of the carrier in a fully extended position;

FIG. 2 is a fragmentary perspective view of the container carrier embodying the present invention wherein the carrier is applied to a large container and is shown with the bail portion in a relaxed position;

FIG. 3 is an enlarged top plan view of the carrier blank prior to assembly to a container;

FIG. 4 is an illustration showing one method of expanding the bail of the carrier in which the bail is calendered and stretched between a set of intermeshing gears.

DESCRIPTION OF THE PREFERRED EMBODIMENT

Referring now to the drawings, one embodiment of the invention will be described as applied to a large container, such as a paint can. FIG. 1 shows the carrier 10 applied to a large container 12 and also shows the bail portion 18 in a fully extended U-shaped configuration upon being grasped by a handler. FIG. 2 shows a configuration similar to that shown in FIG. 1, but FIG. 2 is a representation of the container carrier when in a relaxed or rest position. It will be seen that the bail portion is of an accordionlike configuration in that the pleats 22 are constructed in such a manner that the entire bail portion lies closer to the top of the container than the representation of the carrier in FIG. 1.

The carrier 10 is formed from a flat sheet of material 14, which sheet is resilient, flexible and elastic. The sheet is blanked to form a carrier as shown in FIG. 3. This carrier is a generally flat elliptical configuration having a major and minor axis. It should be understood that the carrier may be of any curvilinear configuration, however, a configuration having a major and minor axis is disclosed as a preferred embodiment. The carrier 10 consists of an endless band 16, a bail portion 18 extending within the confines of the endless band, and spanning the aperture of the endless band thus forming a strap which separates two elongated apertures and a connecting portion 20 which is integral with the bail portion and the endless band.

In the first stages of its manufacture, the container carrier is of a planar configuration with the bail portion lying generally along the major axis of the endless band and being confined wholly within the inner periphery of the endless band. The blank as shown in FIG. 3 is thus understood to be planar in cross section and therefore the bail portion 18, in its initial form, is no longer than the length of the major axis of the endless band. The process of blanking the container carrier with the bail portion extending entirely within the endless band thus is obviously an extremely efficient manner of manufacturing such an article. A substantially larger number of carriers can be produced from a sheet of material by situating the bail portion within the endless band than can be produced when the carrier is blanked with the bail portions situated outside of the endless band. This invention, therefore, produces a container carrier of a one-piece variety using material for the bail portions which heretofore would be considered scrap material.

In operation, it can be shown that in FIG. 2, the container carrier is applied to a large can by stretching or expanding the endless band transversely along the minor axis and compressing said band on the major axis. The endless band then conforms snugly with the outer surface of the complementary container 12 and is, in fact, rotated to a position approximately 90° to its initial, at rest position, in order to conform to a complementary surface.

The method of manufacturing the carrier envisions a discrete manufacturing step being performed on the bail portion either immediately prior to, simultaneous with, or after the application of the band to a container. This step can generally be described as an operation which decreases the thickness of the bail portion and increases the length of the said bail portions. This will therefore, produce a generally U-shaped bail extending above the endless band and its complementary container as shown in the preferred embodiment of FIG. 2. As mentioned previously, this step may be performed either before, during or after the carrier is positioned on its complementary container and the particular order is a matter of preference which may depend on the container or industry involved.

In the preferred embodiment of the invention, the bail portions undergo a cold-working process to obtain the change in dimensions mentioned above. This cold working may be done in a number of known manufacturing methods. A calendering process is one appropriate method of obtaining a desired result. The method of using intermeshing gears to stretch and reduce the thickness of the bail portions by placing the bail portions between the teeth of the intermeshing gears is one appropriate method of obtaining the desired result and is shown in FIG. 4. This method also products a product giving an additional advantage, which is the capability of the bail portion itself to be stretched from one position, at rest, closely overlying the lid of the container, to a second position such as that in FIG. 1, in which the portion is fully stretched when engaged by the hand of an individual carrying the container. Referring to FIG. 4, it is shown that the intermeshing of the gears 24 and 26 will stretch the bail portion 18 and in addition, will give the bail portion a configuration similar to an accordion by providing the pleats 22 as shown in FIG. 2. The stretching of the bail portion can be accomplished by methods other than the use of intermeshing gears such as calendering with cylindrical rollers or even manually stretching the material comprising the bail portion.

The container carrier, with the handle having pleats in FIGS. 1 and 2, provides the user with an advantage not found in any container carrier presently being used. The carrier and container in FIG. 2 will present the user with a handle that provides enough clearance between the bail and the container lid to enable the fingers of a user to be inserted therebetween. Upon applying lifting force to the container, as in FIG. 1, the bail portion will extend to its ultimate length, thus providing a full U-shaped bail portion for the carrier and container combination.

This invention can readily be mass produced by using an infinite length of sheet material 14, and blanking a continuous series of carriers 10, shown in FIG. 3.

This invention therefore, provides a means for carrying a large container without the accompanying unpleasant feeling usually encountered by a wire-type bail "cutting" into the hands of the user. The invention also provides a container carrier with a bail portion or handle means which is capable of contracting into a position which is relatively advantageous for storage. The invention, therefore, provides a container carrier which is formed from a strip of thermoplastic material and blanked in such a manner that the bail portion extends integrally within the periphery of an endless band, thereby utilizing what would previously have been scrap material.

While the invention has been particularly shown and described with reference to a preferred embodiment thereof, it will be understood by those skilled in the art that various changes in form and details may be made therein without departing from the spirit and scope of the invention and claims.

I claim:

1. A method of forming a package from a carrier and container comprising the steps of forming a blank from a sheet of resilient, deformable and elastic material, the blanks being in the form of an endless band with an integral handle strap coplanar with and spanning the aperture of the endless band, decreasing the thickness and increasing the length of the handle strap relative to the endless band, and stretching the endless band transversely while inserting the container through the aperture to embracingly engage the container.

2. A method of forming a package in accordance with claim 1, wherein the dimensions of the handle strap are changed by calendering only the handle strap.

3. A method of forming a handle for a unitary plastic container carrier comprising the steps of forming a blank having at least one handle strap means coplanar with the container-engaging portions of the carrier prior to assembly to a container and cold working the handle strap means in order to substantially decrease the strap thickness and increase the strap length thereby forming an integral upwardly extending generally U-shaped handle.

4. A method of forming a handle in accordance with claim 3 wherein the cold working is done prior to applying the carrier to a complementary container.

5. A method of forming a handle in accordance with claim 3 wherein the cold working is done simultaneous with the placing of the carrier on a complementary container.

6. A method of forming a handle in accordance with claim 3 wherein the cold working is done after the carrier is applied to a complementary container.

7. A method of forming a container carrier of thermoplastic material comprising the steps of blanking a strip of thermoplastic material to form an endless band having a major and minor axis, said endless band including a bail portion extending within the endless band and coinciding with the major axis of the endless band, thus forming a strap which separates two elongated apertures, and cold working only the bail portion by calendering to reduce its thickness and increase its length relative to the endless band, wherein the cold working thus forms a generally U-shaped bail integral with and extending upwardly from the endless band.

8. A method of forming a container carrier in accordance with claim 7, wherein the cold working is accomplished by inserting the bail portion between a set of intermeshing gears thereby increasing the length of the bail portion while reducing its thickness and producing an accordionlike configuration on the bail portion.

9. A unitary container carrier of thermoplastic material adapted for engaging and snugly holding a complementary container comprising an endless band having an inner and outer periphery, a connecting bail portion integral with and connected to the inner periphery of the endless band and extending across the aperture formed by the endless band, said connecting bail portion being of lesser thickness than the endless band and of a length greater than the length of an imaginary line extending between opposite points of connection of the bail portion to the inner periphery of the endless band, wherein the endless band snugly receives the complementary container and the connecting bail portion forms an integral, upwardly extending, generally U-shaped handle for the container carrier in combination with a complementary container.

10. A container carrier in accordance with claim 9 wherein the bail portion is pleated to provide stretching capabilities for the bail.